US007290131B2

(12) United States Patent
Beynon et al.

(10) Patent No.: US 7,290,131 B2
(45) Date of Patent: Oct. 30, 2007

(54) GUARANTEEING HYPERTEXT LINK INTEGRITY

(75) Inventors: Margaret Ann Ruth Beynon, Coventry (GB); Andrew James Flegg, Basingstoke (GB)

(73) Assignee: International Business Machines Corporation, Armonk, NY (US)

(*) Notice: Subject to any disclaimer, the term of this patent is extended or adjusted under 35 U.S.C. 154(b) by 845 days.

(21) Appl. No.: 10/682,391

(22) Filed: Oct. 9, 2003

(65) Prior Publication Data

US 2005/0021997 A1    Jan. 27, 2005

(30) Foreign Application Priority Data

Jun. 28, 2003   (GB)   ................ 0315154.5

(51) Int. Cl.
    *H04L 9/00*   (2006.01)
(52) U.S. Cl. .............. 713/153; 713/161; 713/165; 715/513; 709/219; 726/32
(58) Field of Classification Search ............ 715/513; 707/10, 1.02; 709/203, 219; 713/153, 161, 713/165, 151; 726/32
    See application file for complete search history.

(56) References Cited

U.S. PATENT DOCUMENTS

| | | | | |
|---|---|---|---|---|
| 5,802,299 A | * | 9/1998 | Logan et al. | ............... 709/218 |
| 6,021,202 A | * | 2/2000 | Anderson et al. | ............. 705/54 |
| 6,094,657 A | * | 7/2000 | Hailpern et al. | ........ 707/103 R |
| 6,219,818 B1 | * | 4/2001 | Freivald et al. | ............. 714/799 |
| 6,547,829 B1 | * | 4/2003 | Meyerzon et al. | ........ 715/501.1 |
| 6,638,314 B1 | * | 10/2003 | Meyerzon et al. | .......... 715/513 |
| 6,789,080 B1 | * | 9/2004 | Sweet et al. | .................. 707/10 |
| 2002/0169865 A1 | | 11/2002 | Tarnoff | ....................... 709/223 |

\* cited by examiner

*Primary Examiner*—Emmanuel L. Moise
*Assistant Examiner*—Paul Callahan
(74) *Attorney, Agent, or Firm*—Herman Rodriguez; Schubert Osterrieder & Nickelson PLLC

(57) ABSTRACT

There is described a method, system and computer program product for processing a link embedded in a link document in a client computer, said link comprises a URL reference for a URL document in the client computer or another computer, there being stored a record containing a link reference and an intended fingerprint, said intended fingerprint representing the content of the URL document associated with the URL of the link at the time of or after the link was created, said method comprising the steps of: fetching the intended fingerprint for the link; fetching the URL document; creating a current fingerprint of the fetched URL document; comparing the intended fingerprint and the current fingerprint; and identifying that the intended fingerprint and the current fingerprint are different in a material way. There is further described, on identifying that the intended fingerprint and current fingerprint are different in a material way and there being provided a database of current fingerprints and corresponding URLs, searching the current fingerprint database and locating current fingerprints that are similar to the intended fingerprint; choosing a current fingerprint that matches the intended fingerprint; and changing the URL of the link in link document to match the URL of the matched current fingerprint.

9 Claims, 8 Drawing Sheets

SYSTEM OVERVIEW

FIG. 2   TARGET WEB PAGE

GUARANTEEING HYPERTEXT LINK INTEGRITY

FIELD OF INVENTION

This invention relates to a method and apparatus for guaranteeing hypertext integrity. More specifically it relates to a method of guaranteeing hypertext integrity via a centralised resource.

BACKGROUND OF THE INVENTION

One of the most prolific hypertext systems in recent years has been the World Wide Web which allows inter linked HTML (Hypertext Markup Language) documents to be transmitted between computers on the Internet using HTTP (Hypertext Transfer Protocol). Each document exists as a separate entity, which can be identified by a unique address on the network called a URL (Uniform Resource Locator). This naming scheme allows for one party to reference to another's work by including a URL which points to the referenced work such that a web site belonging to a first party links to a second party document.

A web site value is measured by the availability, accuracy, relevance and reliability of the page being linked to. When a document on the web site is removed, replaced, altered or moved such value measurements can changed for the worse. Therefore making any change to a web site could have a detrimental effect on the value of the web site and the value of other web sites that link to it.

The problem relates to web site maintenance, specifically of pages which link to documents which subsequently move, change, disappear or get replaced. These interconnecting links form the backbone of the World Wide Web and are often a valuable business tool in forming alliances and cross-promotion.

There is a requirement for web site owners to be able to guarantee that their site is as up-to-date as possible, with invalid links and inappropriate content discovered and repaired quickly.

This is also a more general problem affecting any system which contains links or pointers between items of information, for example, entries in a relational database.

Tools do exist that crawl through HTML documents either locally or over HTTP, reporting broken links. Such a tool indicates to the web site owner that URL document of a particular link is no longer there. These tools do not indicate if the link still points to the same page and cannot give any guidance on whether the information has changed. The tools also do not attempt to resolve broken links or identify new locations for moved content. In the particular case of HTTP, if a web site owner is aware that a document that was linked-to has moved, and they know where it has moved to, they can set up their site so that when the resource is accessed a '302 Moved' response is sent. However, the onus is on the web site owner to find the new location of the page and to manually set up the redirection facility. Also the web site administrator must allow this facility to be set up. A problem for a web site administrator is that the content of the site is owned by someone other than the web site administrator but that complaints about broken links are more likely to come to the web site administrator especially on an intranet.

The problem of broken links is so severe that Google™ (Google is a trademark of Google Technology Inc.) has taken to caching whole pages that people can view if the search result is a broken link. Another solution from Google is to find similar documents for documents located in a search. Although this is not specifically limited to broken links it can be useful when a document is not available due a broken link. 'Similar documents' in a Google search means other documents in the same category as the located document and Google specifically excludes very close matches to the located document.

One solution, U.S. patent Publication US2002/0169865, discloses a software agent called Revbot to detect a changed page and then trigger a central resource which reindexes the changed page. Such central resources are typically search engine network nodes. This publication discloses how software agents are installed on the web site's computer platform and are aware of search engines and other qualifying databases and lists located at other nodes. The RevBot can be used to filter, block and enhance web site content. By working in a manner that is the reverse of a search engine, a RevBot is installed on a web site's computing platform and is aware of a search engine located remotely on a network. It transmits data relating to the web site, such as the synopsis of the recently changed content, to the search engine. When a web server changes a document, Revbot will request that the search engine updates its index. This helps the search provider and users of this search engine.

Although the above description relates to a completely broken link, the problem also extends to a link which does not return the internal document.

An object of at least one of the embodiments is to assist an administrator of a web site and content owner in maintaining the integrity of the hyperlinks.

An object of at least one of the embodiments is to locate the information and URL document that the content owner originally intended to link to.

Another object of at least one of the embodiments is to make each fingerprint unique to the content of a URL document not to URLs.

Another object of at least one of the embodiments is to locate the original of moved and altered content automatically whereby such an embodiment can be trusted to maintain a set of documents without manual intervention.

Another object of at least one of the embodiments is to update stored information as frequently as it is configured to do so and to provide information on demand.

Another object of at least one of the embodiments is to verify the state of a web site and guarantee that it is fully functional, accurate and up to date.

Another object of at least one of the embodiments is to protect confidential information with a secure system.

SUMMARY OF INVENTION

According to a first aspect of the present invention there is provided a method of processing a link embedded in a link document in a client computer.

A URL (uniform resource location) defines the location in the Internet of a document, such a document is referred to as a URL document. A link is a URL reference, it is physical code or mark-up language in a document (called a link document henceforth) that includes a URL, refers to a URL document, and may refer to a position within the URL document. Although a link document can be a URL document and vice versa the two documents are normally distinct in this specification and it is not envisaged that they would refer to the same document at the same time. A link reference is physical code or mark-up language (in a data structure distinct from a link document and a URL document) that includes the link, refers to the link document and may refer to the position of the link in the link document. Generating a fingerprint of a document comprises calculating a potentially unique numerical value in multidimensional content space for that document which is distinct from categorising the document in a defined index structure. A material difference in simplest terms is a percentage change in the content of the document and depends on the embodiment. A difference of more than 5% of the content of a document can be taken as more than a material difference in the document whereas a difference of 50% can be consider a completed changed document and essentially a broken link.

The first aspect of the invention thereby identifies a link which no longer points to the intended URL document, the intended URL document having been removed completely or changed completely or changed in a small way.

According to a second aspect of the present invention there is provided a system for processing a link embedded in a link document in a client computer.

According to a third aspect of the present invention there is provided a computer program product as embodied in a computer-readable medium that directs a processor to perform one or more sets of data processing tasks relating to a link embedded in a link document in a client computer.

Although the preferred embodiment is described in terms of Internet technology the invention is also suited for application in other forms of document and links to document. For instance, the invention could be implemented for database records having pointers in links embedded in a link document.

The method advantageously further comprises: on identifying that the intended fingerprint and current fingerprint are different in a material way and there being provided a database of current fingerprints and corresponding URLs, searching the current fingerprint database and locating current fingerprints that are similar to the intended fingerprint; choosing a current fingerprint that matches the intended fingerprint; and changing the URL of the link in link document to match the URL of the matched current fingerprint.

Suitably the method further comprises checking all links in a link document in a systematic order.

More suitably the method further comprises checking all links in a group of link documents in a systematic order Preferably the method further comprises, if a intended fingerprint does not exists for a link, creating a link fingerprint from a URL document and storing the intended fingerprint and associated link reference More preferably the method further comprises, if a intended fingerprint does not exist for a link and a URL document does not exist for a link, creating a broken link report.

Even more preferably the method further comprises, if the located similar current fingerprints are not within a permitted level of similarity, creating a broken link report.

Advantageously the method further comprising: spidering from a seed URL; creating current fingerprints from the seed URL document and descendent URL documents; and storing the current fingerprints and associated URLs.

The matched current fingerprint may correspond to a copy of the original URL document, a previous or future version of the originally requested document, or another URL document closely related to the original URL document by virtue of its content. If the original URL document has been changed significantly then another URL document may match the intended fingerprint better.

In the preferred embodiment the current fingerprints are stored in a Resource Location Broker (RLB) which at its simplest is a database residing on a client, web server or third party broker. The intended fingerprints are stored as part of a link controller residing on a client, web server or third party broker. The RLB may be part of a search engine and the current fingerprint database existing along with the URL index of the search engine. The steps of fetching and identifying the intended fingerprint are performed in the link controller. This aspect of separating the RLB (current fingerprint database) and the link controller (intended fingerprint database) components allows for flexibility of the solution to several configurations of client, web server and third part broker. Four example configurations are described in embodiments 1 through 4. In all embodiments 1 to 4 the link controller and the link documents are included on a client computer or within a client network, however in an alternate embodiment the link document and link controller are separated and the link controller provides a service for link documents on a customer computer.

In the first embodiment a client includes an RLB, link controller and link document.

In the second embodiment a client includes a link controller and a link document; a web server includes both the URL documents and an RLB.

In a third embodiment, the client includes a link controller and the link document, the web server includes a URL document and a third party broker includes a RLB.

In a fourth embodiment, the client is part of an intranet and includes a link controller, a link document, a URL document and an internal RLB for constructing fingerprints of the client URL documents. A web server includes a URL document linked to from within the intranet and a broker includes a global RLB.

One advantage of at least one embodiments is to reduce the problem of hacked links on a web site. Often a link on a site can be changed by a malicious party to point to an unrelated document such as advertising or a pornography site. By storing an intended fingerprint it is possible to detect and fix such maliciously changed links.

DESCRIPTION OF DRAWINGS

In order to promote a fuller understanding of this and other aspects of the present invention, embodiments of the invention will now be described, by means of example only, with reference to the accompanying drawings in which.

DESCRIPTION OF THE EMBODIMENTS

Figure 1:
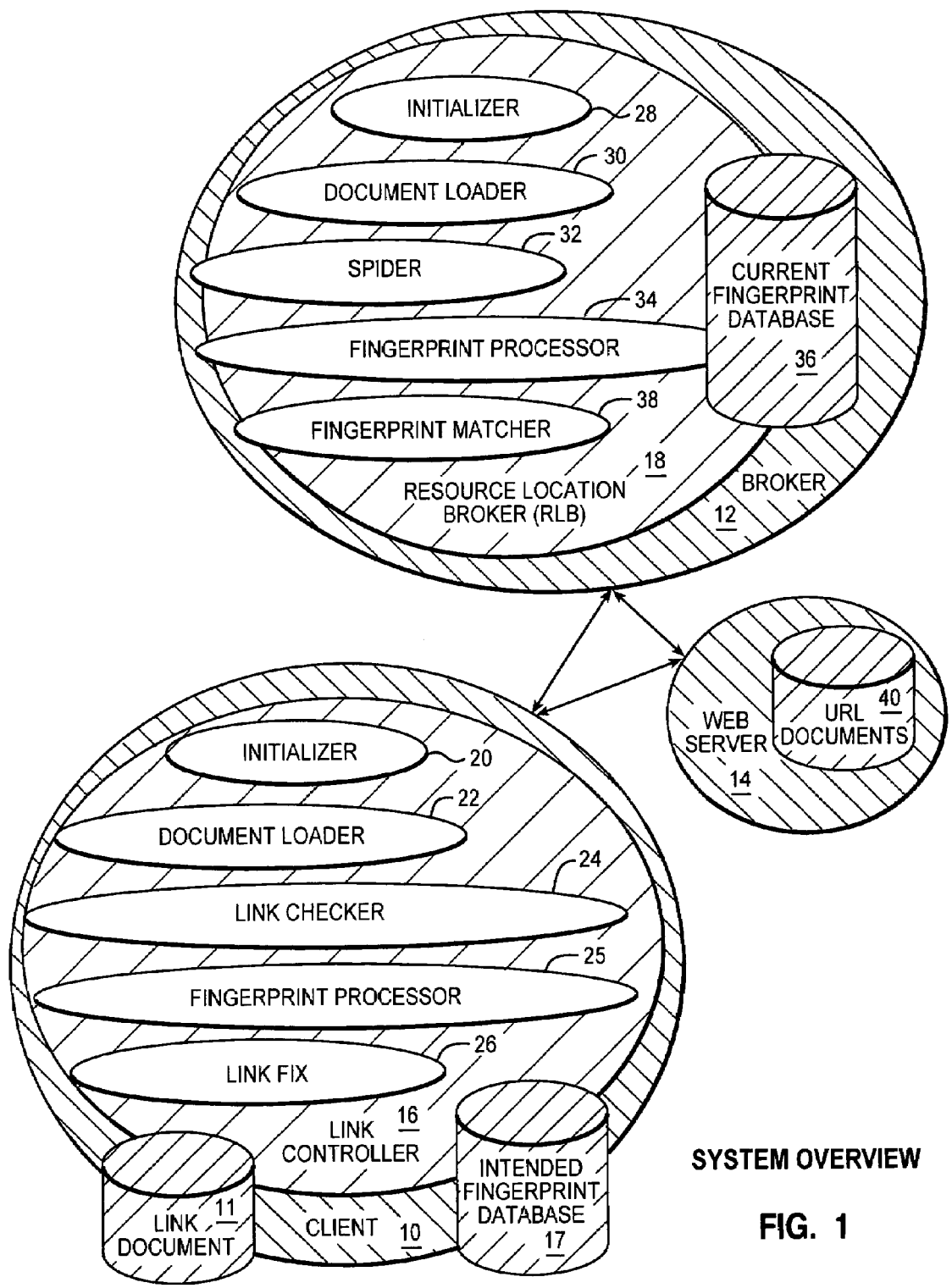
FIG. 1 shows a schematic system overview of a preferred embodiment of the invention including a broker server and a client server.

Referring to FIG. 1 there is shown an overview of the preferred embodiment which is the third embodiment in the description of the embodiments at the end of this specification. The preferred embodiment is implemented for a system comprising a client 10, broker 12 and web server 14. The preferred embodiment comprises: a link controller 16 residing on the client 10 and a resource location broker (RLB) 18 residing on the broker 12.

The link controller 16 comprises: a intended fingerprint database 17; an initialiser 20; a document loader 22; a link checker 24; a fingerprint processor 25; and a link fix component 26. The methods of the link controller 16 are described further on with respect to FIG. 4. The RLB 18 comprises: an initialiser 28; a document loader 30; a spider 32; a fingerprint processor 34; current fingerprint database 36; and fingerprint matcher 38. Web server 14 comprises a document database 40 accessible to the client 10 and broker 12 via a network.

Figure 2:
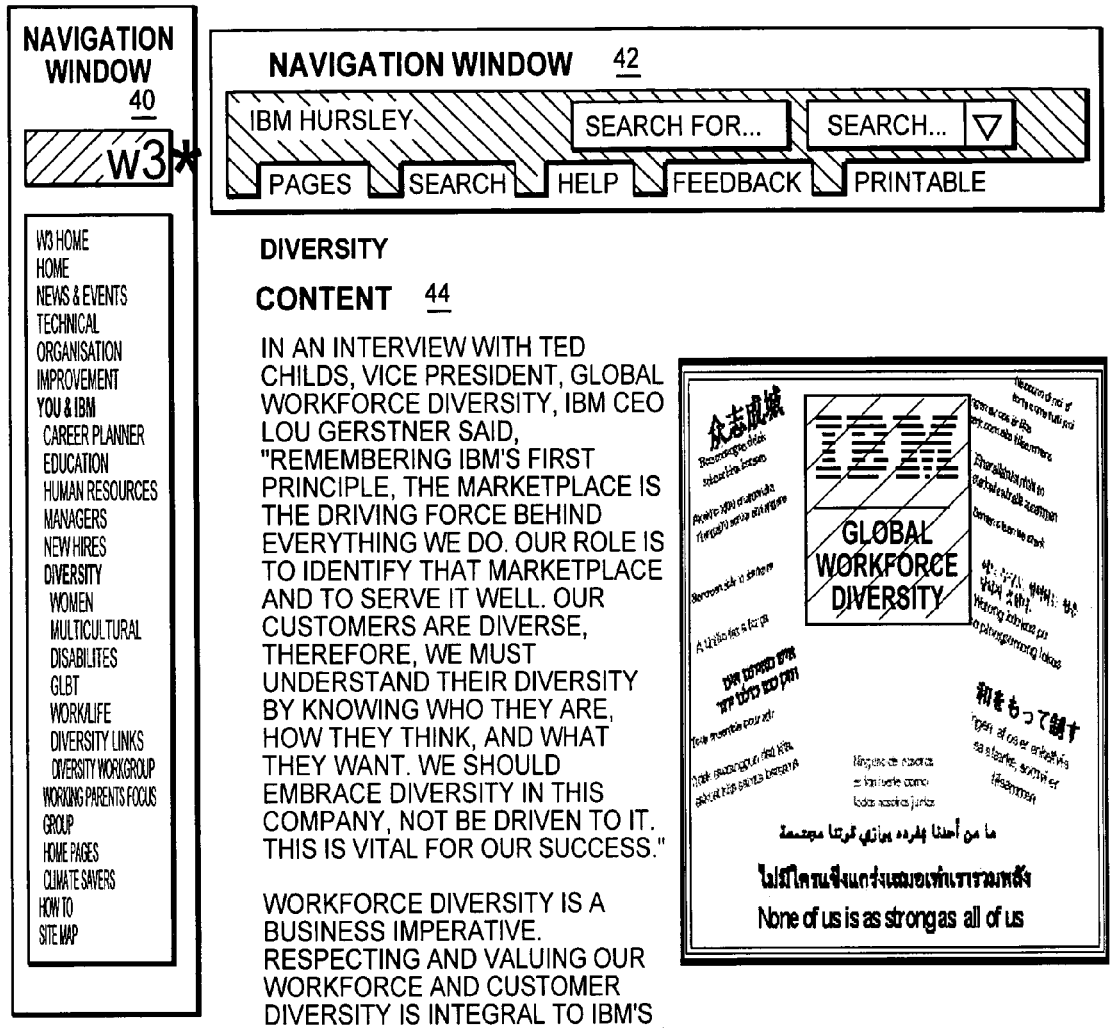
FIG. 2 shows a web document that is the target of the preferred embodiment.

In the preferred embodiment, the fingerprint processor 25 in the link controller 16 and fingerprint processor 34 in the RLB 18 are able to parse a document completely to locate the contents and then generate a unique identification for the document from the contents. The fingerprint processors scan a document, as is shown in FIG. 2, and ignore parts of the document which are not content. In an HTML document the fingerprint processors can ignore table cells which are solely used for navigation within a site, and pass the remainder as content to the fingerprint generator stage. FIG. 2 shows a fairly common layout of navigation down the left hand side (navigation window 40), a standard header (navigation window 42 ) and a large content area 44 indicated by the dotted lines. The parser isolates the content area 44 to the exclusion of the navigation areas in the preferred embodiment and provides such content area for fingerprint generating. Metadata from the document is included in fingerprint generation because it can help to source and locate different versions of the same document when it is difficult to tell from small changes in the content.

In another embodiment of the invention, the navigation area is used in the creation of the fingerprint as it can help set the position of the document within the web site.

The fingerprint is a numerical representation of the content of the document and may be considered a multidimensional vector in content space. It is stored in a matrix format using normal array structures. Note, however, that checksum algorithms such as MD5 would not be appropriate as the result of an MD5 sum on a document varies wildly with small changes.

The fingerprint is defined by certain properties: Property 1—unique identifier for content rather than URL; Property 2—guaranteed same identifier generated for same content; Property 3—comparable with another identifier to find degree of difference; Property 4—small change in content results in small change in identifier; Property 5—large change in content results in small change in identifier; Property 6—degree of difference between identifiers represents degree of difference in content; Property 7—content cannot be derived from the identifier; Property 8—generated from main content and not static headers and footers; and Property 9—storage requirements less than average content. For the system to correctly identify moved content, it needs to store a unique identifier which can be used to locate the same content at a different URL or the closest approximation to it.

In the preferred embodiment and referring to FIG. 1, link controller 16 sits in the client and provides the functionality on the client side. The actual changing of the link is performed by a link fix 26. The link controller 16 is executed whenever the client wants to fix links in link containing documents on the client or on a server that it has publish access to.

Web server 14 contains documents having URLs in the links of documents on the client. Therefore documents on the web are referred to as URL documents and documents containing links are called link documents. The web server 14 can be located within the client's enterprise or is an external web server belonging to a third party perhaps including a customer.

The intended fingerprint database 17 stores a fingerprint for each occurrence of a link in the link documents. So for the same URL there may be several links and therefore several fingerprint entries in the link database. Such fingerprints maybe referred to as intended fingerprints.

Initialiser 20 generates a starting link list by uploading links from the intended fingerprint database 17. Typically this will be all the documents on the client's database.

Document loader 22 is enabled to load a link document into working memory.

Link checker 24 tests the status of the returned document for the URL of the link and determines if the URL document is non-existent. If there is no intended fingerprint then link checker 24 will forward the link on to the fingerprint processor so that a new fingerprint can be generated and stored for future use. A newly generated fingerprint can be referred to as a current fingerprint but once it is stored with respect to a particular link it becomes an intended fingerprint.

Link fix 26 has two inputs for a first condition when a link URL returns a URL document and a second condition when a link URL does not return a URL document. In the first case, if the URL document is considered the same as intended by the link, nothing is done and the component passes control. However, in the first case, if the URL document is considered different enough to that intended, a new URL is located that matches better the original intention of the link. The intention is assumed to be as indicated by the intended fingerprint. A query containing the intended fingerprint is passed to the RLB and a new URL is returned. If the new URL returns a URL document that is considered similar enough then the link in the link document is edited to that returned URL, if not then the link is marked as broken. In the second case, a query containing the intended fingerprint is passed straight to the RLB and a new URL is returned. Again, if the new URL returns a URL document that is considered similar enough then the link is edited to such a URL, if not then the link is marked as broken.

Other functionality such as controlling the components in relation to a list of links is performed by the Link controller 16.

The Resource Location Broker (RLB) 18 is a centralised resource which has two functions: firstly to spider a defined set of hypertext URL documents and store current fingerprints for all the content found; and secondly to accept queries from link controllers to match a intended fingerprint in the current fingerprint database.

The first function is performed by the initialiser 28; document loader 30; spider 32; and fingerprint processor 34 and described with respect to the components of the RLB 18 in FIG. 1. A description of the method steps are described later with respect to FIG. 3. The initialiser 28 supplies a first URL to start the spidering, such a URL is a search engine index root for maximum coverage so that queue A starts with a seed URL and traverses each link for subsequent links until there are no more links. The document loader 30 loads a URL document at the first link URL in the queue. The spider 32 proceeds to create a new list, queue B, of all the URLs in the downloaded document and to add them to queue A if they are not already there. Fingerprint processor 34 creates and stores a fingerprint for the document. The RLB 18 manages the next URL in queue A and passes it, step 504, on to the document loader or exits if there is no more URLS.

The second function is performed by the fingerprint matcher 38. Fingerprint matcher 38 accepts queries in the form of a first fingerprint and searches the current fingerprint database 36 for matching fingerprints and corresponding fingerprints and URLs. The nearest matching fingerprint and URL is sent back to the requester. In a variation of this several matching fingerprints with corresponding URLs are returned so that the requester can choose between them.

In the case of a web site on the web server 14, a link controller 16 may find that the web server 14 (e.g. at www.xyz.com) is returning an error code (such as '404 not found' with a protocol such as HTTP) for the URL being queried; or that a document is returned, but the fingerprint is so wildly different it can be assumed that the page has been replaced or dramatically altered.

Once a new URL is determined for a link, link controller 16 rewrites the link in the local document using the newly determined URL. The rewriting of the link is possible by using the application programming interfaces of a content management system which may be in use, such as Lotus Domino or of any operating system which handles files.

Figure 3:
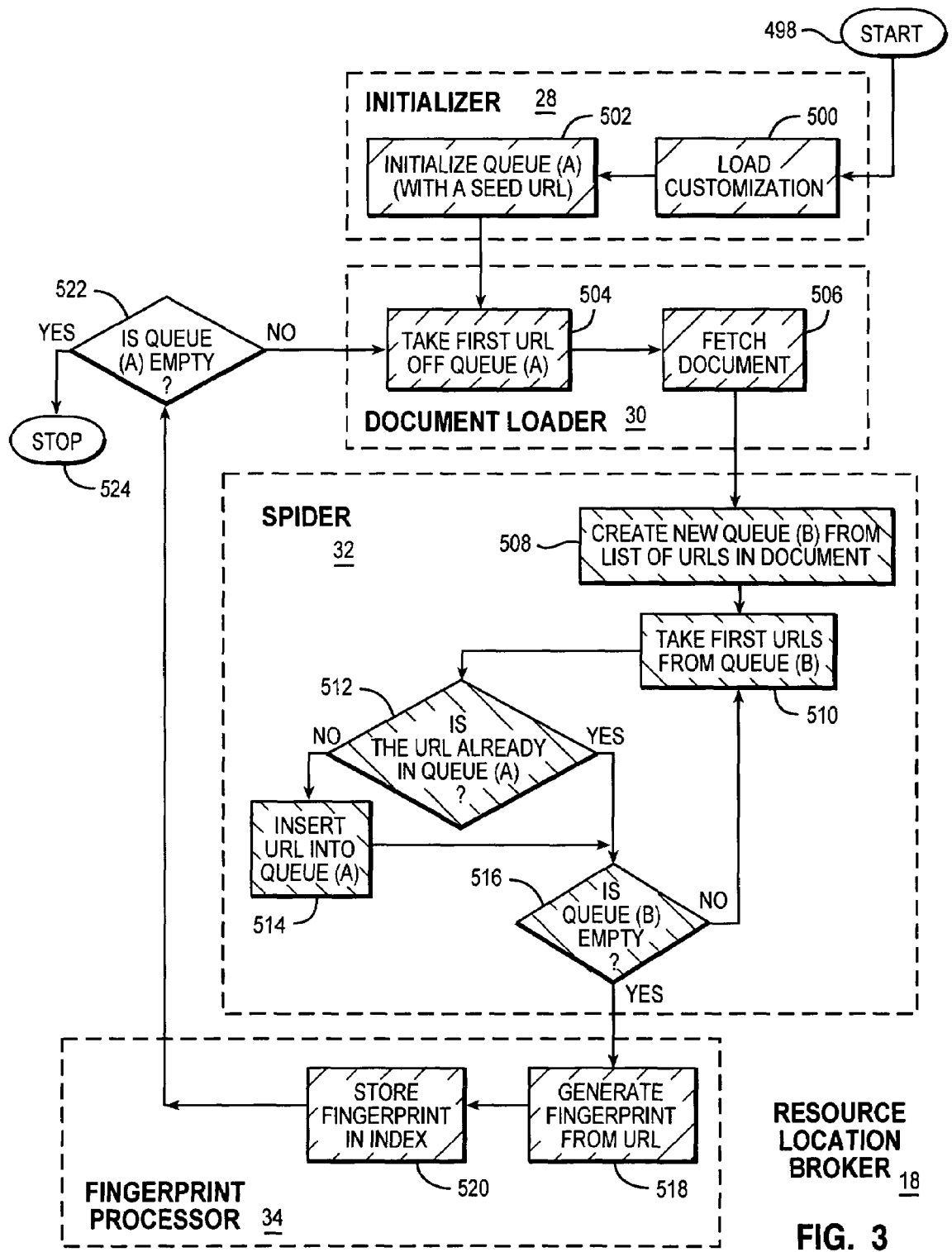
FIG. 3 shows a schematic diagram of the components and process of a broker server of FIG. 1.

The RLB spider process will now be described in relation to FIG. 3. Steps 500 to 502 are performed by the link controller initialiser 20. Step 500, load settings such as the seed link; links to include/exclude from spidering, for example: limiting spidering to within company and blocking inappropriate content.

Step 502, start of the spidering process. A queue of links (A) is initialised with a seed link.

Steps 504 to 506 are performed by the RLB document load 22. Step 504, a URL document pointed to by the top link in the queue A is fetched, (referred to as the document in progress) and the top link is removed from queue A, step 506.

Steps 508 to 516 are performed by the RLB spider 32. Step 508, start of the sub process for inserting all links in the URL document into queue A. A new queue (B) is created from all the links in the URL document. For example, by parsing the HTML and extracting all the 'href' attributes from 'a' tags. Step 510, the next link in the queue (B) is taken from it. Step 512, if the link is not already present in queue (A), it is inserted step 514. Step 516, are there more links in queue (B)? If so, go back to step 510. Otherwise, end of the sub process for inserting all links in the URL document into queue (A) and move onto step 518.

Steps 518 and 520 are performed by the Fingerprint processor 34. Step 518, the fingerprint (a current fingerprint) for the URL document in progress is calculated. Step 520, the current fingerprint is stored in a current fingerprint database using an index against the URL of the link which allows rapid searching by querying for fingerprints within a specified difference.

Step 522 queries whether there are more links in queue (A). If so, skip to 504. Otherwise, end of the spidering process step 524.

Figure 4:
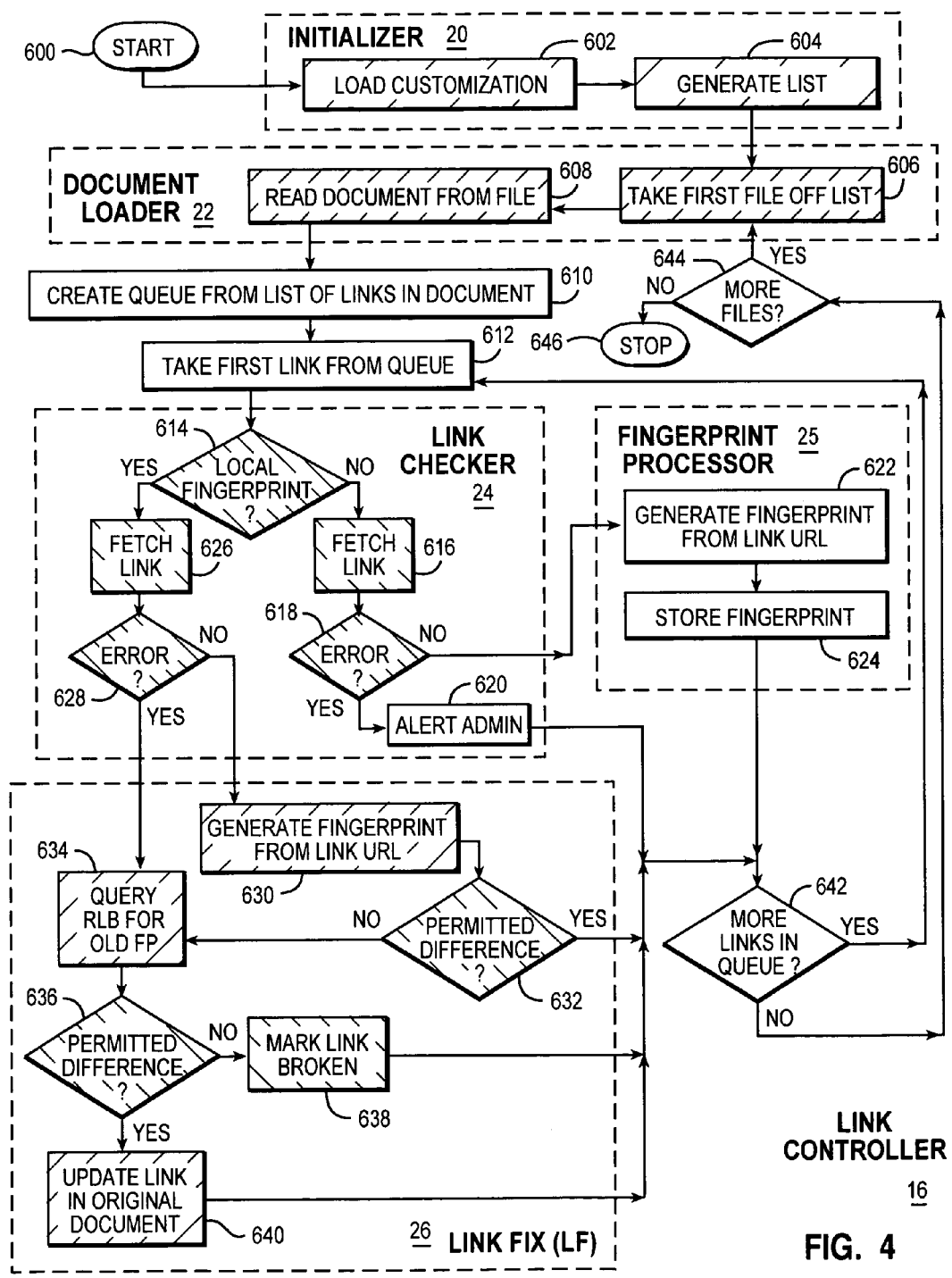
FIG. 4 shows a schematic diagram of the components and process of a client server of FIG. 1.

The link controller process will now be described with respect to FIG. 4. Step 600 is the start of the process in the link controller 16.

Steps 602-604 performed in initialiser 20. Step 602, user settings are loaded which, for example, will define: the threshold for automatic changing of links; and the administrator email address. Step 604, a list of all hypertext files under the document root is created.

Steps 606-608 are performed by the document loader 22. Step 606, the next file in the list is taken from the head of the list and loaded, step 608, into memory.

Step 610, start of checking individual links. A list of links within the client document is retrieved or created. For example, by parsing the client's HTML link documents and extracting all the 'href' attributes from 'a' tags.

Step 612, the first link in the list is taken from the link list and placed in working memory.

Steps 614, 616, 618, 620, 626 and 628 are performed by the Link Checker 24.

Step 614, the link is checked to see if a intended fingerprint is associated with it, such a intended fingerprint may have been created at installation or from an earlier run of the software. The intended fingerprint is loaded into a working memory.

Step 616, start of sub process where a intended fingerprint is not available. The linked URL document is fetched into a working memory.

618 If an error code is returned, than administration is alerted, step 620, to the fact that the link is broken. This is the limit of current broken link checking software. The next step is step 642.

Steps 622-624 are performed by fingerprint processor 25.

If, step 618, an error code is not returned, the current fingerprint of the fetched URL document in the working memory is calculated, step 622, and stored, step 624, in working memory. Skip to 642.

Step 626 in the link checker 24 is the start of sub process where the intended fingerprint is available. Step 626, the linked URL document is fetched.

Step 628, checks to see if an error code is returned to signify that there is no URL document at this URL. If no URL document at the URL then skip to step 634 in link fix 26. If there is a URL document then go to step 630 in the link fix 26.

Steps 630-640 are performed by the link fix 26. Step 630, start of sub process where error code is not returned. The current fingerprint of the URL document in working memory is calculated and placed into working memory, step 630, and compared, step 632, with the intended fingerprint. If the difference is above a set threshold, then skip to step 634; otherwise if the difference is below the set threshold then skip to 642. End of sub process where error code is not returned.

Step 634 finds identical current fingerprints for the intended fingerprint by making a request to the RLB 18. The RLB 18 performs a search (see FIG. 6C) for current fingerprints which are within a specified difference and returns the set of URL links, associated current fingerprints, and associated differences. In an adapted embodiment two fingerprints are sent to the RLB in a current fingerprint lookup, the intended fingerprint and also the fingerprint of the link document so that the RLB search can take account of the types of documents linking to the linked document when determining the best match.

In step 636, the results are checked at the client and a URL is chosen from the results. Some results will not be acceptable to the client for various reasons and the client can choose which URL to link to. It may be that none of the results are suitable and the difference between the fingerprints is above a second threshold which in this embodiment is the same as or similar to the first threshold. In this case step 638 is next otherwise step 640.

In step 638, if the difference between the closest result and the intended fingerprint is above the second threshold then the link is marked as broken. A routine for notifying the web master of the broken link is called, typically writing the list of broken links and closest URLs returned by the RLB 18 to a system file. This is the end of sub process where intended fingerprint is available and the process moves to step 642.

Step 640, the difference between the current fingerprint and the intended fingerprint is below the set threshold. The URL of the link in the link document is substituted for the URL of the chosen current fingerprint. The process moves to step 642.

Step 642, are there more links to check in this link document? If so the process goes back to step 612. Otherwise, this is the end of on link document and the process moves to step 644.

Step 644, are there more link documents in the list? If so, go to step 606, if not this is the end of the process.

An example of the operation of the preferred embodiment is described.

The general solution presented here provides a secure, centralised resource location broker (RLB) and an application which can be installed on a web server to auto-correct invalid links, by plugging into a Content Management System (CMS); or as a stand-alone application on a workstation. Although the solution below uses terms appropriate to web site maintenance, the same concepts can be directly applied to the more general case of systems containing linked information.

A global RLB 18 is a central resource which is aware of all URL documents which may be linked to; for each document it stores the document URL and a current fingerprint which uniquely identifies the content presented in the document Two documents, at different URLS, may contain the same content. When this occurs, the same fingerprint will be stored for the separate documents which allows for dynamic rewriting of the link if one of the documents becomes inaccessible. The mapping of URLs to fingerprints in a current fingerprint table is similar to table 1 below:

TABLE 1 example portion of a current fingerprint table

| URL | Fingerprint |
|---|---|
| www.abc.com/manual.html | AAA AAA AAA AAG |
| www2.abc.com/manual.html | AAA AAA AAA AAG |
| www.xyz.com/product/zz9plA.html | GCA TCG ATA DOG |
| www.xyz.com/product/cat.html | GCA TCG ATA CAT |
| www.xyz.com/index.html | TAC GAT GTA CGT |
| www.xyz.com/index.html#part1 | AAG AGA GTT ACC |
| www.xyz.com/index.html#part2 | GCC ATT TGA CTA |

Table 1 example portion of a current fingerprint table

The client application, link controller 16, maintains a intended fingerprint table similar to the table 2 below:

TABLE 2 example portion of a intended fingerprint table.

| Link | Fingerprint |
|---|---|
| www.abc.com/home/web/htdocs/example.html:: www.abc.com/manual.html | AAA AAA AAA AAG |
| www.abc.com/home/web/htdocs/example.html:: www2.abc.com/manual.html | AAA AAA AAA AAG |
| www.abc.com/home/web/htdocs/example.html:: www.xyz.com/product/zz9plA.html | GCA TCG ATA CAT |
| www.abc.com/home/web/htdocs/example.html:: www.xyz.com/index.html | TAC GAT GTA CGT |
| www.abc.com/home/web/htdocs/example.html:: www.xyz.com/index.html#part1 | AAG AGA GTT ACC |
| www.abc.com/home/web/htdocs/example.html:: www.xyz.com/index.html#part2 | GCC ATT TGA CTA |
| www.abc.com/home/web/htdocs/example2.html:: www.abc.com/manual.html | AAA AAA AAA AAG |
| www.abc.com/home/web/htdocs/example2.html:: www2.abc.com/manual.html | AAA AAA AAA AAG |
| www.abc.com/home/web/htdocs/example2.html:: www.xyz.com/product/zz9plA.html | GCA TCG ATA CAT |
| www.abc.com/home/web/htdocs/example2.html:: www.xyz.com/index.html | TAC GAT GTA CGT |
| www.abc.com/home/web/htdocs/example2.html:: www.xyz.com/index.html#part1 | AAG AGA GTT ACC |
| www.abc.com/home/web/htdocs/example2.html:: www.xyz.com/index.html#part2 | GCC ATT TGA CTA |

Table 2 example portion of a intended fingerprint table.

The intended fingerprint table contains fingerprints for each link it follows within the web site for which it is responsible. In table 2 there are two similar documents: example.html and example2.html having links to the same URLs but stored as separate links in the table. On an automated schedule the link controller 16 will work through its configured document tree (such as the root of a company's web server) and verify that the link returns a valid URL document. It will then calculate the current fingerprint for the returned content and check that it is either the same as the intended fingerprint or that is within a specified allowable degree of similarity. If it is the same it shows the document has not changed at all but if within the allowable difference (allowing for minor changes to document content, such as the fixing of spelling mistakes) then the document has changed. There will also be cases where the fingerprint is wildly different and in such cases the link is deemed to be broken.

For example, consider a link document example.html which resides in the directory /home/web/htdocs on the client server, www.abc.com which sits within the company's fire wall. This document is accessible at the URL: www.abc.com/example.html and contains the following fragment of HTML, indicating a link to a page on a remote web server:

<a href=www.xyz.com/product/zz9plA.html>XYZs reciprocating splines</a>

This arrangement can be seen below, but is only one possible encoding; hypertext systems other than HTML may define links differently.

ABC LTD's web master configures link fix 16 to run at 1 am on a Sunday morning. The process is the same whether or not the link controller 16 has been run before:

The link controller 16 works through the document root on www.abc.com and, at some point, finds /home/web/htdocs/example.html.

The structure of the file is analysed and the link to URL www.xyz.com/product/zz9plA.html is found.

The URL document is fetched from the web server 14 and its fingerprint 'GCA TCG ATA CAT' acquired from the intended fingerprint database 17. In this first example a valid document is received and a further fingerprint is generated 'GCA TCG ATA DOG'. The newly generated fingerprint 'GCA TCG ATA DOG' is compared with the retrieved information 'GCA TCG ATA CAT'. In this first example the fingerprint is not identical to the fingerprint stored and the RLB 18 is queried with the 'GCA TCG ATA CAT' fingerprint. The RLB returns URL www.xyz.com/product/cat.html which is associated with 'GCA TCG ATA CAT'. The link controller 16 then updates the link document with this new URL.

In this example the similarity is exact but one of the considerations the user will have to make when deciding whether or not to enable this option is that a document could have changed within the specified degree of similarity each time the application runs. However, over a longer period of time this could result in a totally different document which would be outside the specified allowed degree of similarity. At this stage only documents which have a fingerprint outside the allowable degree of similarity which returned an invalid status code remain.

Several embodiments are now described referring to FIGS. 6A to 6D. In the first, second, third and fourth embodiment the link controller 16 resides in the client 10. In the first and second embodiment the RLB 18 resides on the client 10 and the document server 14 respectively but in the third and fourth embodiment an RLB 18 resides on the broker 12.

Figure 5A:
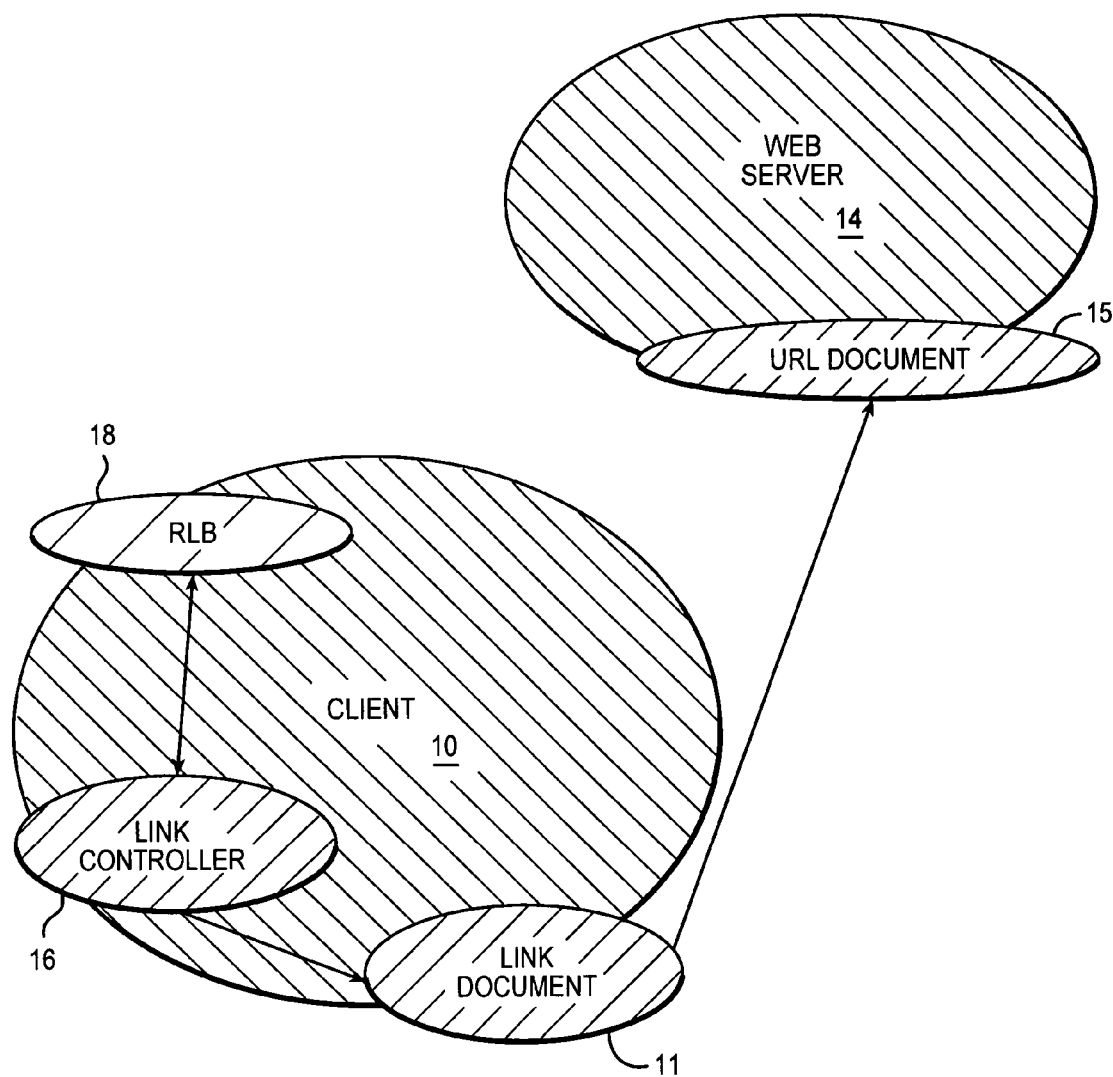
FIG. 5A shows the configuration of a first embodiment of the invention in which a client comprises: a resource location broker (RLB); and a link controller.

In a first embodiment (see FIG. 5A), the client comprises link controller 16 and RLB 18. Link document 11 in client 10 is shown linking to URL document 15 on web server 14. The client based RLB 18 stores current fingerprints so if the client resources are limited the pool of current fingerprints will not be sufficient to provide the best matches.

Figure 5B:
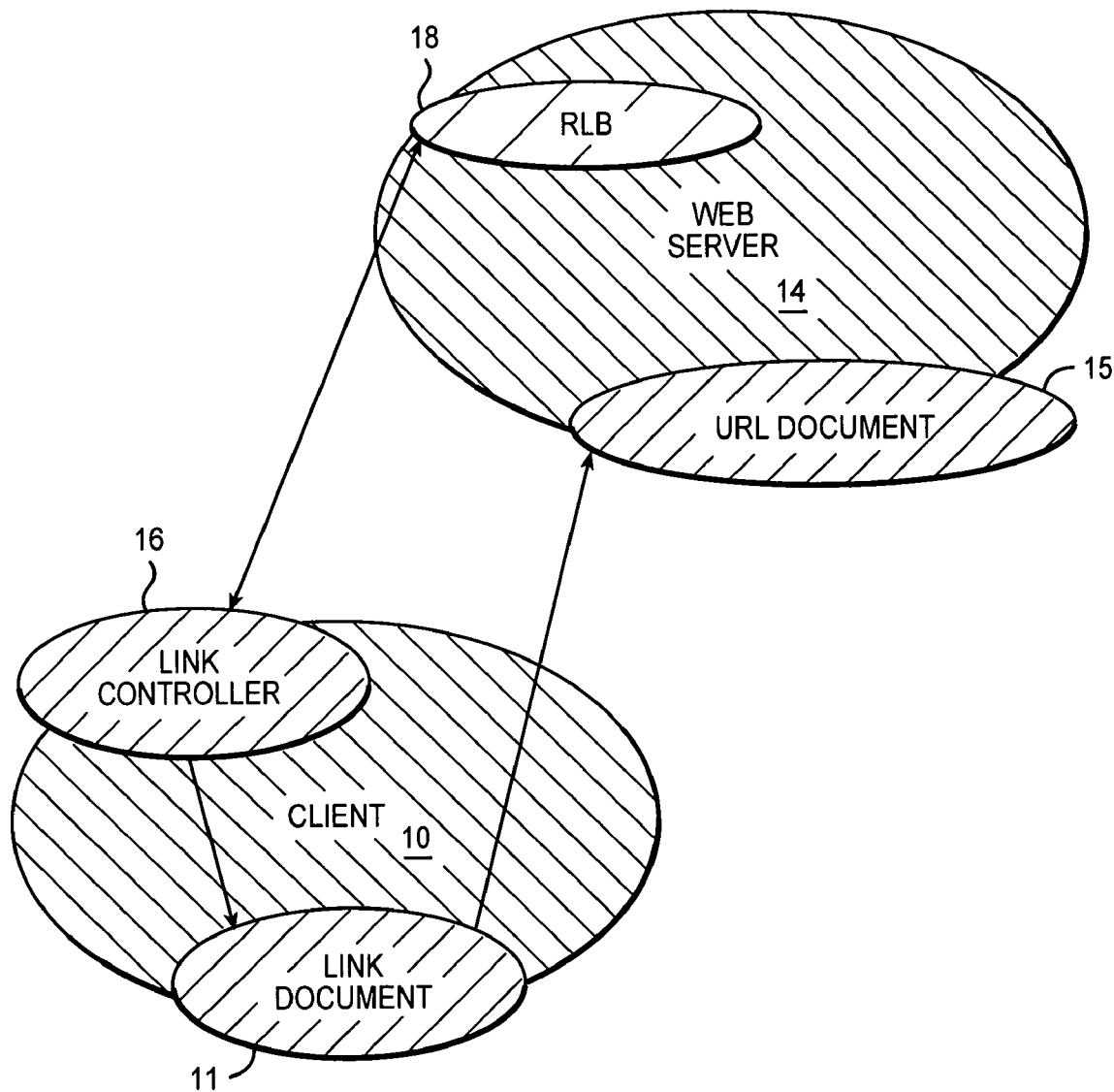
FIG. 5B shows the configuration of a second embodiment of the invention in which a client comprises a link controller; and a web server comprises an RLB.

In a second embodiment (see FIG. 5B), the client 10 contains the link controller 16 and the web server 14 stores the current fingerprint records in RLB 18, the web server 14 receives the request, locates the URL of a version of the first document using the current fingerprint records and returns the located URL to the requester server. Link document 11 is shown linking to URL document 15. The client 10 fixes the link with the located URL. In this embodiment the web server based RLB 18 has fingerprints for all the documents on web server 14. Therefore when the client 10 discovers that a link pointing to the web server needs to be fixed it can query the web server RLB directly.

Figure 5C:
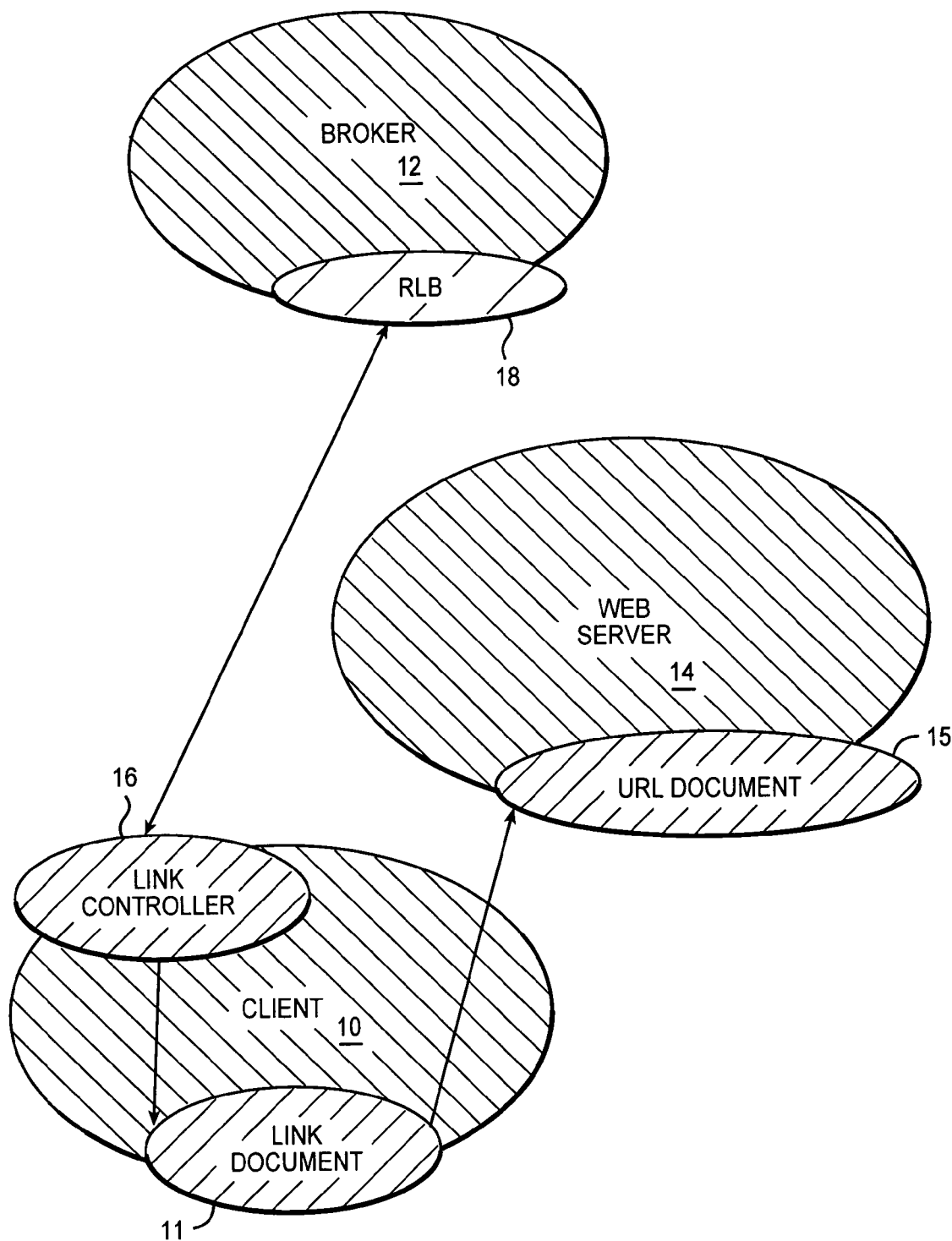
FIG. 5C shows the configuration of a third embodiment of the invention in which a client comprises a link controller and a third party server comprises a global RLB.

In the third embodiment and preferred embodiment, see FIG. 5C, the client 10 comprises the link controller 16 and link document 11. A link in link document 11 points to URL document 15. The broker 12 comprises the RLB 18 and receives the request for a matching fingerprint record. If the RLB 18 can not find an exact match for the intended fingerprint it locates a current fingerprint (e.g. fingerprint of URL document 15) that is as close as possible to that in the request. The client then fixes the link in the link document 11 with the located URL of URL document 15.

The third and preferred embodiment of the invention uses a single RLB 18 to determine the current fingerprints of documents on the Internet. A single RLB uses less resource then if multiple local RLB's spidered the same web sites. Therefore, it would be more efficient if link controller on other clients queried a single global RLB for any other documents which many have similar fingerprints. A dedicated third party server in theory has more resources available to store and analysis fingerprints and therefore return better matches.

A variation of the third and preferred embodiment is a service provided on a global scale over the Internet, using web services: SOAP for the communication and UDDI for RLB-discovery. The business model could typically be to sell subscriptions to the RLB and give the application away free.

A problem that the third embodiment does not solve is when a client (e.g. ABC Ltd) wants to use the link controller within its intranet, the global RLB would be unable to spider their internal documents. Therefore the client talks to a local RLB within a fire wall. The local RLB is configured to only spider the documents within the intranet and so its database will only contain fingerprints for documents internal to ABC Ltd. If the link controller 16 is configured to only talk to the local RLB then it cannot link to web server 14. Chaining of RLBs is used to overcome this problem.

Figure 5D:
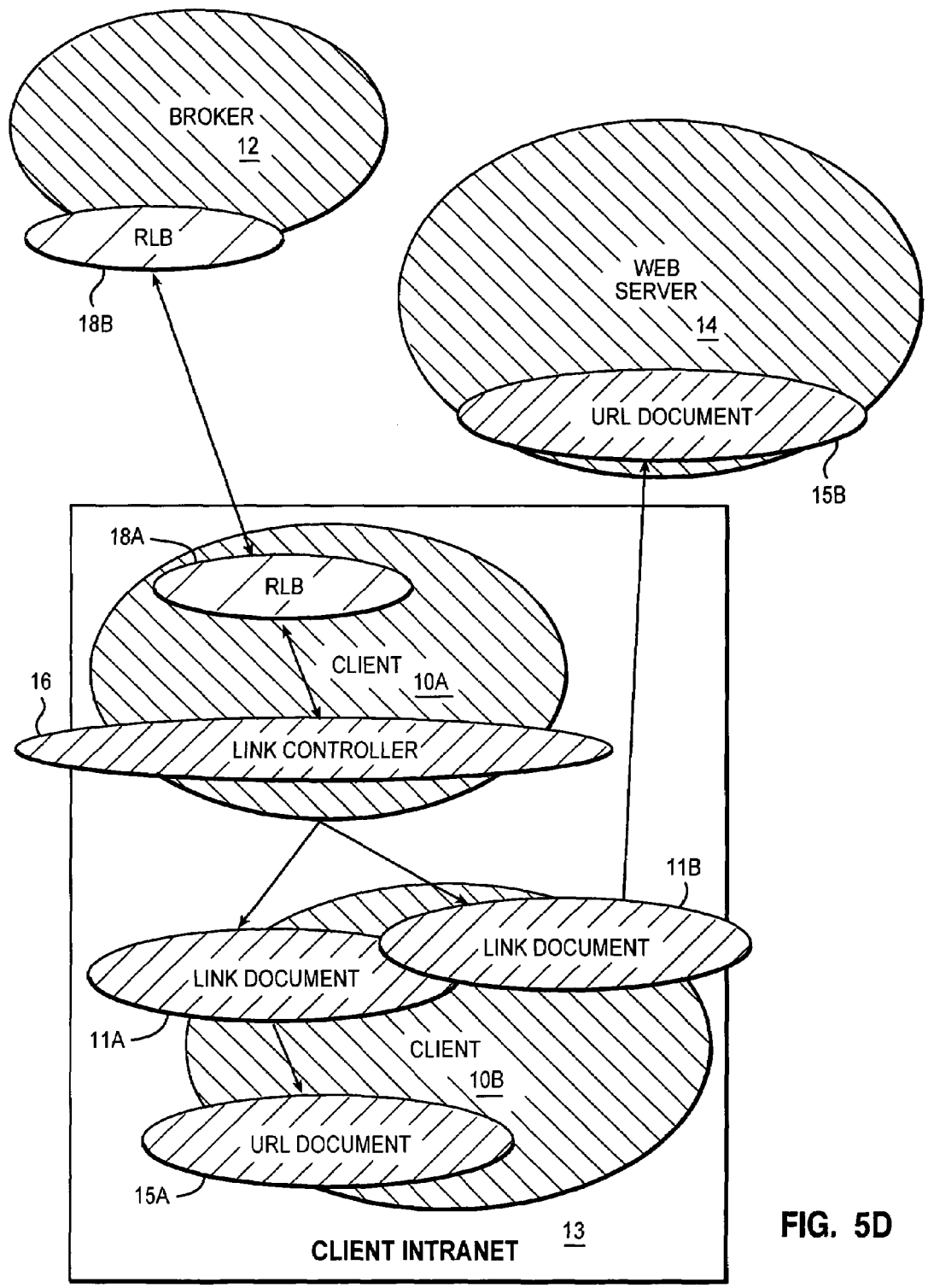
FIG. 5D shows the configuration of a fourth embodiment of the invention in which a client comprises a link controller and a private RLB and a third party server comprises a global RLB.

In a fourth embodiment (see FIG. 5D), the client 10A includes RLB 18A as well as link controller 16. An example link, link 11, resides on client 10B within client intranet 13. Link 11 is a hypertext link in a document on client 10B and points to document 15 on the web server 14.

Client RLB 18A stores for documents on intranet servers for reasons of web security and does not allow external indexing or spiders. Therefore broker RLB 18B does not spider the intranet 13 but instead receives current fingerprint data directly from RLB 18A so that it has effectively fingerprinted the documents on the intranet. In an adapted embodiment RLB 18A will receive requests from RLB 18B to perform searches. RLB 18A receives a request to fix a link 11A or 11B and if it cannot locate a close matching fingerprint it will forward the request to RLB 18B. Conversely, for RLB 18B requests from clients not part of the intranet 13 can be forwarded to RLB 18A. If the RLB 18A recognises the a link URL as outside of its scope (for example, it may be outside of the intranet) it will pass the query to RLB 18B and then return the response to link controller 16. Link controller 16 is not aware of this extra request, except for a potentially longer response time. In addition to allowing spidering of internal documents, the above arrangement also prevents exposing the structure of the internal web pages to an external body and can also be used to provide scalability by cascading and distributing queries.

Although the preferred embodiment is described in terms of its main components it is assumed that these component boundaries need not be limited to the methods described since the invention maybe implemented in many ways including object oriented program techniques, procedural techniques and a mixture of both.

Although the embodiments are described in terms of a client which fixes links on local documents on the client or intranet, the documents can be anywhere on a network where the client has publisher access. In a further embodiment the client is a web service and charges its user for fixing links.

What is claimed is:

1. A method of processing a link embedded in a link document in a client computer, said link comprises a URL reference for a URL document in the client computer or another computer, there being stored a record containing a link reference and an intended fingerprint, said intended fingerprint representing the content of the URL document associated with the URL of the link at the time of or after the link was created, said method comprising the steps of:

fetching the intended fingerprint of the link;
fetching the URL document;
creating a current fingerprint of the fetched URL document;

comparing the intended fingerprint and the current fingerprint;
identifying that the intended fingerprint and the current fingerprint are materially different; and
creating a broken link report if the intended fingerprint does not exist for said link and said URL document does not exist for said link.

2. A method of processing a link embedded in a link document in a client computer, said link comprises a URL reference for a URL document in the client computer or another computer, there being stored a record containing a link reference and an intended fingerprint, said intended fingerprint representing the content of the URL document associated with the URL of the link at the time of or after the link was created, said method comprising the steps of:
fetching the intended fingerprint of the link;
fetching the URL document;
creating a current fingerprint of the fetched URL document;
comparing the intended fingerprint and the current fingerprint;
identifying that the intended fingerprint and the current fingerprint are materially different; and
creating a broken link report if located similar current fingerprints are not within a permitted level of similarity.

3. A method of processing a link embedded in a link document in a client computer, said link comprises a URL reference for a URL document in the client computer or another computer, there being stored a record containing a link reference and an intended fingerprint, said intended fingerprint representing the content of the URL document associated with the URL of the link at the time of or after the link was created, said method comprising the steps of:
fetching the intended fingerprint of the link;
fetching the URL document;
creating a current fingerprint of the fetched URL document;
comparing the intended fingerprint and the current fingerprint;
identifying that the intended fingerprint and the current fingerprint are materially different, and if the intended fingerprint and the current fingerprint are materially different, there being provided a database of the current fingerprints and corresponding URLs;
spidering from a seed URL;
creating current fingerprints from the seed URL document and descendent URL documents;
storing the current fingerprints and associated URLs.
searching the current fingerprint database;
locating the current fingerprints that are similar to the intended fingerprint;
choosing the current fingerprint that matches the intended fingerprint; and
changing the URL of the link in the link document to match the URL of a matched current fingerprint.

4. A system for processing a link embedded in a link document in a client computer, said link comprises a URL reference for a URL document in the client computer or another computer, said system comprising:
a record containing a link reference and an intended fingerprint, said intended fingerprint representing the content of the URL document associated with the URL of the link at the time of or after the link was created;
means for fetching the intended fingerprint of the link;
means for fetching the URL document;
means for creating a current fingerprint of the fetched URL document;
means for comparing the intended fingerprint and the current fingerprint;
means for identifying that the intended fingerprint and the current fingerprint are materially different; and
means for creating a broken link report if the intended fingerprint does not exist for said link and said URL document does not exist for said link.

5. A system for processing a link embedded in a link document in a client computer, said link comprises a URL reference for a URL document in the client computer or another computer, said system comprising:
a record containing a link reference and an intended fingerprint, said intended fingerprint representing the content of the URL document associated with the URL of the link at the time of or after the link was created;
means for fetching the intended fingerprint of the link;
means for fetching the URL document;
means for creating a current fingerprint of the fetched URL document;
means for comparing the intended fingerprint and the current fingerprint;
means for identifying that the intended fingerprint and the current fingerprint are materially different; and
means for creating a broken link report if located similar current fingerprints are not within a permitted level of similarity.

6. A system for processing a link embedded in a link document in a client computer, said link comprises a URL reference for a URL document in the client computer or another computer, said system comprising:
a record containing a link reference and an intended fingerprint, said intended fingerprint representing the content of the URL document associated with the URL of the link at the time of or after the link was created;
means for fetching the intended fingerprint of the link;
means for fetching the URL document;
means for creating a current fingerprint of the fetched URL document;
means for comparing the intended fingerprint and the current fingerprint;
means for identifying that the intended fingerprint and the current fingerprint are materially different, and if the intended fingerprint and the current fingerprint are materially different, there being provided a database of the current fingerprints and corresponding URLs;
means for spidering from a seed URL;
means for creating current fingerprints from the seed URL document and descendent URL documents;
means for storing the current fingerprints and associated URLs.
means for searching the current fingerprint database;
means for locating the current fingerprints that are similar to the intended fingerprint;
means for choosing the current fingerprint that matches the intended fingerprint; and
means for changing the URL of the link in the link document to match the URL of a matched current fingerprint.

7. A computer program-product embodied in a computer-readable memory medium that directs a processor to perform one or more sets of data processing tasks relating to a link embedded in a link document in a client computer, said link comprises a URL reference for a URL document, said computer program product comprising a record containing a link reference and an intended fingerprint, said intended fingerprint representing the content of the URL document associated with the URL of the link at the time of or after the link was created, said computer program product further comprising computer program instructions stored on a computer-readable storage medium, for, when loaded into a computer and executed, causing the computer to carry out the steps of:
- fetching the intended fingerprint of the link;
- fetching the URL document;
- creating a current fingerprint of the fetched URL document;
- comparing the intended fingerprint and the current fingerprint;
- identifying that the intended fingerprint and the current fingerprint are materially different; and
- creating a broken link report if the intended fingerprint does not exist for said link and said URL document does not exist for said link.

8. A computer program-product embodied in a computer-readable memory medium that directs a processor to perform one or more sets of data processing tasks relating to a link embedded in a link document in a client computer, said link comprises a URL reference for a URL document, said computer program product comprising a record containing a link reference and an intended fingerprint, said intended fingerprint representing the content of the URL document associated with the URL of the link at the time of or after the link was created, said computer program product further comprising computer program instructions stored on a computer-readable storage medium, for, when loaded into a computer and executed, causing the computer to carry out the steps of:
- fetching the intended fingerprint of the link;
- fetching the URL document;
- creating a current fingerprint of the fetched URL document;
- comparing the intended fingerprint and the current fingerprint;
- identifying that the intended fingerprint and the current fingerprint are materially different; and
- creating a broken link report if located similar current fingerprints are not within a permitted level of similarity.

9. A computer program-product embodied in a computer-readable memory medium that directs a processor to perform one or more sets of data processing tasks relating to a link embedded in a link document in a client computer, said link comprises a URL reference for a URL document, said computer program product comprising a record containing a link reference and an intended fingerprint, said intended fingerprint representing the content of the URL document associated with the URL of the link at the time of or after the link was created, said computer program product further comprising computer program instructions stored on a computer-readable storage medium, for, when loaded into a computer and executed, causing the computer to carry out the steps of:
- fetching the intended fingerprint of the link;
- fetching the URL document;
- creating a current fingerprint of the fetched URL document;
- comparing the intended fingerprint and the current fingerprint;
- identifying that the intended fingerprint and the current fingerprint are materially different, and if the intended fingerprint and the current fingerprint are materially different, there being provided a database of the current fingerprints and corresponding URLs;
- spidering from a seed URL;
- creating current fingerprints from the seed URL document and descendent URL documents;
- storing the current fingerprints and associated URLs.
- searching the current fingerprint database;
- locating the current fingerprints that are similar to the intended fingerprint;
- choosing the current fingerprint that matches the intended fingerprint; and
- changing the URL of the link in the link document to match the URL of a matched current fingerprint.

* * * * *